W. A. BUCKNAM & W. STICKEL.
RESILIENT WHEEL.
APPLICATION FILED AUG. 2, 1915.
1,168,598.
Patented Jan. 18, 1916.
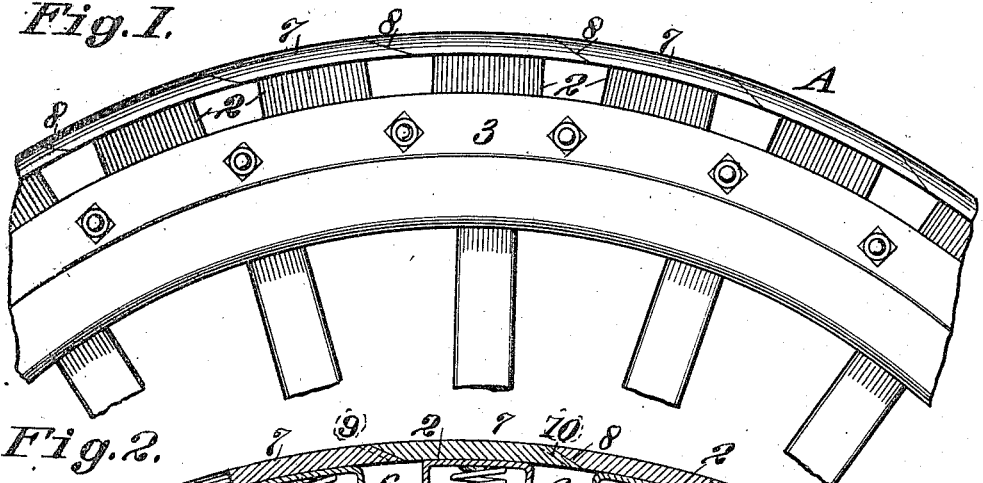
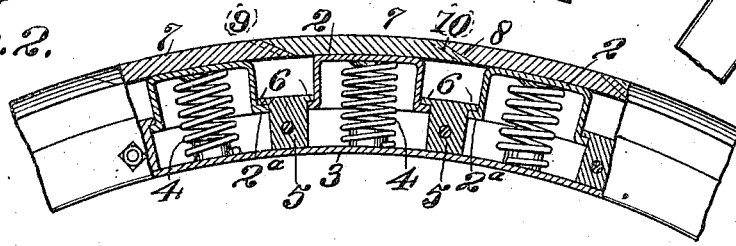
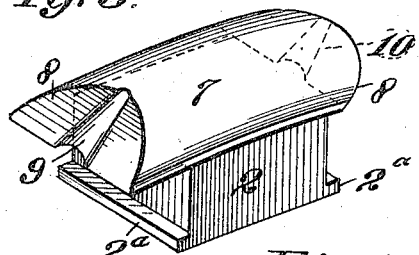
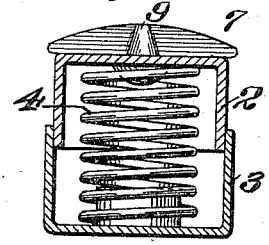
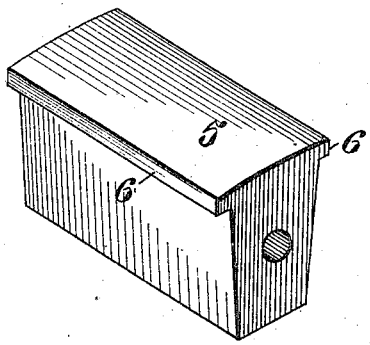
WITNESSES:
Charles Pickles
J. H. Herring
INVENTORS
William A. Bucknam
William Stickel.
BY Stonger & Townsend
ATTORNEYS

UNITED STATES PATENT OFFICE.

WILLIAM A. BUCKNAM, OF TRUCKEE, AND WILLIAM STICKEL, OF GREENWOOD, CALIFORNIA.

RESILIENT WHEEL.

1,168,598.     Specification of Letters Patent.     Patented Jan. 18, 1916.

Application filed August 2, 1915. Serial No. 43,193.

*To all whom it may concern:*

Be it known that we, WILLIAM A. BUCKNAM, of Truckee, in the county of Nevada and State of California, and WILLIAM STICKEL, of Greenwood, in the county of Eldorado and State of California, citizens of the United States, have invented new and useful Improvements in Resilient Wheels, of which the following is a specification.

Our invention relates to improvements in resilient wheels.

It consists of springs mounted radially upon the rim of a wheel, extending outwardly therefrom and having inclosing casings closed at the outer end and adapted to carry the tread shoes of the wheel. Between these casings are intermediate filler blocks, pivoted to the annular, channeled wheel rim and having flanges projecting and adapted to be engaged by similar flanges upon the casings to limit the outward movement of said casings; and to provide a circumferentially rigid structure which is radially flexible by compression of the tread members as they pass beneath the wheel in contact with the ground.

It also comprises details of construction which will be more fully explained by reference to the accompanying drawings, in which—

Figure 1 is a fragment of a wheel, showing an exterior view of the tread and casings. Fig. 2 is a vertical section of a portion of the rim of the wheel transverse to the axis, the wheel in this instance being provided with a dust proof ring, as shown. Fig. 3 is a perspective view of a casing and its tread member. Fig. 4 is a transverse section of the same, showing the inclosed spring. Fig. 5 is a detached view of one of the fillers.

A represents a wheel, having a hub, spokes and felly of any usual or suitable construction and surrounded by a rim 3, which, in the present case, is shown as channeled in transverse section, with the open portion outward. This rim serves to receive and guide the hollow casings 2. These casings are preferably made rectangular and carry, upon their outer closed periphery, sections 7 of the tread. These sections are fixed to and movable with the casings 2 and may be made of rubber or metal. In the present case they are shown with beveled or inclined ends overlapping each other like the scales of a fish, and, when in place, forming a continuous surface. These overlapping edges are shown at 8 and they are provided with alternate grooves 9 and tongues 10; the grooves being formed upon one of the sloping or beveled ends of the shoe and the tongues 10 being formed at the opposite end, so that when all are disposed in line, the tongue of one engages the groove of the contiguous tread plate, and thus insures their proper alinement when they return to their normal position after being compressed.

These tread plates and the casings 2 rest upon springs 4 which are of sufficient strength to support the weight of the carriage. The inner ends of these springs rest within the bottom of the channeled rim 3 where they are suitably maintained in position. The outer ends of the springs abut against the interior of the casings 2, to which they may be secured, if desired. A series of these casings is spaced apart a short distance and extend entirely around the wheel, with their sectional shoes overlapping each other to form a complete tread.

In order to maintain these in the proper position and make them substantially rigid, circumferentially, we have shown the inner edges of each casing as turned outwardly, forming flanges, as at $2^a$. These flanges engage with similar flanges 6 which are formed upon the wedge-shaped filler pieces 5. The taper of the sides of these fillers is such that they form parallel channels between them in which the rectangular casings 2 are freely slidable under compression of the contained springs. The flanges 6 abut against the sides of the rectangular casings 2 and thus prevent their moving in the direction of the circumference of the wheel, while the channeled rim 3 retains them in position transversely and the taper of the fillers 5 forms the proper rectangular-shaped spaces for the reciprocation of the casings 2.

Having thus described our invention, what we claim and desire to secure by Letters Patent is—

1. The combination with a wheel having a channeled rim, of a circumferential series of casings independently slidable in the channel of the rim, resilient means supporting the casings for independent movement, and a tread shoe carried by each casing in abutting relation with the adjacent shoes to form a continuous tread, the abutting ends of the shoes being beveled and one end being provided with a tongue extending entirely across the same while the other end is provided with a groove to receive the tongue and thus lock the abutting shoes in alinement.

2. The combination with a wheel having a channeled rim, of rectangular interspaced hollow casings closed at their outer ends and fitting between the sides of the rim, the inner edges of the casings being provided with flanges turned outwardly toward the adjacent casings, a spiral spring for each casing having its inner end resting in the channel and its outer end extending within and resting on the closed outer end of the casing, wedge-shaped filling blocks secured to the rim sides and forming guide spaces within which the casings are slidable, the outer portion of each filling block being provided with oppositely projecting flanges overlying the flanges of the adjacent casings, and a tread shoe carried by each casing and abutting the adjacent tread shoes with the abutting ends lying in overlapping relation, one of the abutting ends of adjacent shoes being formed with a tongue extending across the end and the other end being formed with a groove normally receiving the tongue.

In testimony whereof we have hereunto set our hands in the presence of two subscribing witnesses.

WILLIAM A. BUCKNAM.
WILLIAM STICKEL.

Witnesses:
 WILLIAM H. BRYRON,
 ADOLPH G. WALKER.

Copies of this patent may be obtained for five cents each, by addressing the "Commissioner of Patents, Washington, D. C."